United States Patent
Brosz et al.

(10) Patent No.: US 8,726,529 B2
(45) Date of Patent: May 20, 2014

(54) ROTARY SENSOR ASSEMBLY

(75) Inventors: Christopher Jerel Brosz, West Fargo, ND (US); Olaf Niedziolka, Berlin (DE); Mark Allan Renard, Page, ND (US); Michael Sylvester Bares, Fargo, ND (US); Brad Johnson, Fargo, ND (US); Shannon Peter Roehrich, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 221 days.

(21) Appl. No.: 13/431,166

(22) Filed: Mar. 27, 2012

(65) Prior Publication Data

US 2013/0255089 A1    Oct. 3, 2013

(51) Int. Cl.
*G01B 7/30* (2006.01)
*G01B 5/24* (2006.01)

(52) U.S. Cl.
USPC .................................. 33/1 N; 33/1 PT

(58) Field of Classification Search
USPC .......................... 33/1 N, 1 PT, 534
See application file for complete search history.

(56) References Cited

U.S. PATENT DOCUMENTS

| | | | |
|---|---|---|---|
| 3,039,087 A | 6/1962 | Huston | |
| 3,435,974 A | 4/1969 | Omon | |
| 3,524,562 A | 8/1970 | Fuzzell | |
| 4,172,688 A | 10/1979 | Cecchi et al. | |
| 5,627,467 A | 5/1997 | Lee et al. | |
| 5,657,544 A | 8/1997 | Ota et al. | |
| 6,564,480 B1 | 5/2003 | Tomita et al. | |
| 6,568,091 B1 * | 5/2003 | Mercer et al. | 33/1 PT |
| 6,735,877 B2 * | 5/2004 | Torr | 33/1 PT |
| 6,880,254 B2 * | 4/2005 | Uehira et al. | 33/1 PT |
| 7,344,351 B2 | 3/2008 | Rokusek et al. | |
| 7,367,128 B2 * | 5/2008 | McMurtry et al. | 33/1 PT |
| 7,637,019 B2 * | 12/2009 | Brandl | 33/1 PT |
| 8,146,259 B2 * | 4/2012 | Schroter et al. | 33/1 PT |
| 8,499,464 B2 * | 8/2013 | Goll et al. | 33/1 PT |

FOREIGN PATENT DOCUMENTS

| | | |
|---|---|---|
| JP | 53007026 | 1/1978 |
| JP | 1090324 | 4/1989 |

* cited by examiner

*Primary Examiner* — Christopher Fulton
(74) *Attorney, Agent, or Firm* — Patrick M. Sheldrake

(57) ABSTRACT

A sensor assembly for measuring relative rotary movement about a pivot joint having an axis of rotation between a first member and a second member.

20 Claims, 7 Drawing Sheets

ROTARY SENSOR ASSEMBLY

FIELD OF THE INVENTION

The present invention relates generally to the field of sensor assemblies. It relates more particularly to rotary sensor assemblies measuring relative angular movement between two members about an axis of rotation.

BACKGROUND OF THE INVENTION

Articulated machines having members that rotate with respect to each other are used in many applications. For example, a wheel loader includes lift arms that not only pivot with respect to the wheel loader frame, but also has multiple pivoting connections with an implement, such as a bucket. It is desirable to have sensors that can measure the angular movement of pivot joints from which the position of the members can be determined, including the ability to measure the tilt angle of the bucket. Mechanical components that directly couple two pivoting members to a rotary sensor may be used. However, while rotary sensors used in sensor assemblies may be positioned to measure a relative rotational movement of one member with respect to another member about an axis of a pivot or pivoting joint, the sensors are quite delicate, and unable to withstand other forces, such as side loads normally associated with the interconnection of such mechanical components. In order to avoid such undesirable forces, often a result of misalignment due to tolerance build-up between mechanical components assembled together, the mechanical components must typically be machined using greater levels or degrees of precision, which adds significant cost, and still may not result in a sensor assembly that performs satisfactorily.

Accordingly, it would be desirable to have a rotary sensor assembly utilizing mechanical components that isolate the sensor from non-desirable forces, while reducing the level or degree of precision required to fabricate the mechanical components.

SUMMARY OF THE INVENTION

The present invention relates to a sensor assembly for measuring relative rotary movement about a pivot joint having an axis of rotation between a first member and a second member. The sensor assembly includes a housing having a proximal end and a distal end and an inner surface, the proximal end fixedly secured to the first member. A first fitting has an outer surface and an opening, the outer surface abutting the inner surface of the housing between the proximal end and the distal end. The opening formed in the first fitting is substantially parallel to the axis of the pivot joint. A sensor is secured to the opening and facing the proximal end of the housing. A shaft is rotatable about the axis of the pivot joint and affixed to the sensor and extending through the opening of the first fitting. The shaft is journaled along a portion of the opening of the first fitting that faces a distal end of the housing. A flexible coupling is configured to fixedly receive a portion of the shaft extending from the opening of the first fitting so that the flexible coupling and the shaft rotate together. A first pair of pins extends from the flexible coupling. A cap is rotatable about the axis of the pivot joint and has an outside surface, a first pair of openings, and a second pair of openings. The outside surface of the cap corresponds to the inner surface of the housing. The first pair of openings is configured to receive the first pair of pins extending from the flexible coupling. The second pair of openings is configured to receive a second pair of pins extending through the distal end of the housing. A bracket is secured to the second member and extending to a slot configured to receive the second pair of pins.

The present invention further relates to a method for measuring relative rotary movement about a pivot joint having an axis of rotation between a first member and a second member. The method includes securing to the first member a sensor assembly including a housing having a proximal end and a distal end and an inner surface, the proximal end fixedly secured to the first member. A first fitting has an outer surface and an opening, the outer surface abutting the inner surface of the housing between the proximal end and the distal end. The opening formed in the first fitting is substantially parallel to the axis of the pivot joint. A sensor is secured to the opening and facing the proximal end of the housing. A shaft is rotatable about the axis of the pivot joint and affixed to the sensor and extending through the opening of the first fitting. The shaft is journaled along a portion of the opening of the first fitting that faces a distal end of the housing. A flexible coupling is configured to fixedly receive a portion of the shaft extending from the opening of the first fitting so that the flexible coupling and the shaft rotate together. A first pair of pins extends from the flexible coupling. A cap is rotatable about the axis of the pivot joint and having an outside surface, a first pair of openings, and a second pair of openings. The outside surface of the cap corresponds to the inner surface of the housing. The first pair of openings is configured to receive the first pair of pins extending from the flexible coupling. The second pair of openings is configured to receive a second pair of pins extending through the distal end of the housing. The method further includes securing to the second member a bracket that extends to a slot configured to receive the second pair of pins.

An advantage of the present invention is that the level or degree of precision between the sensor assembly and the vehicle compensates for the manufacture of the vehicle to reduced dimensional precision, while isolating the sensor from forces induced by the reduced level or degree of precision of the vehicle.

Another advantage of the present invention is a modular construction that may be used for multiple pivot joints on the same or different devices.

It is to be understood that an embodiment of the present invention may incorporate one or more of the identified advantages.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
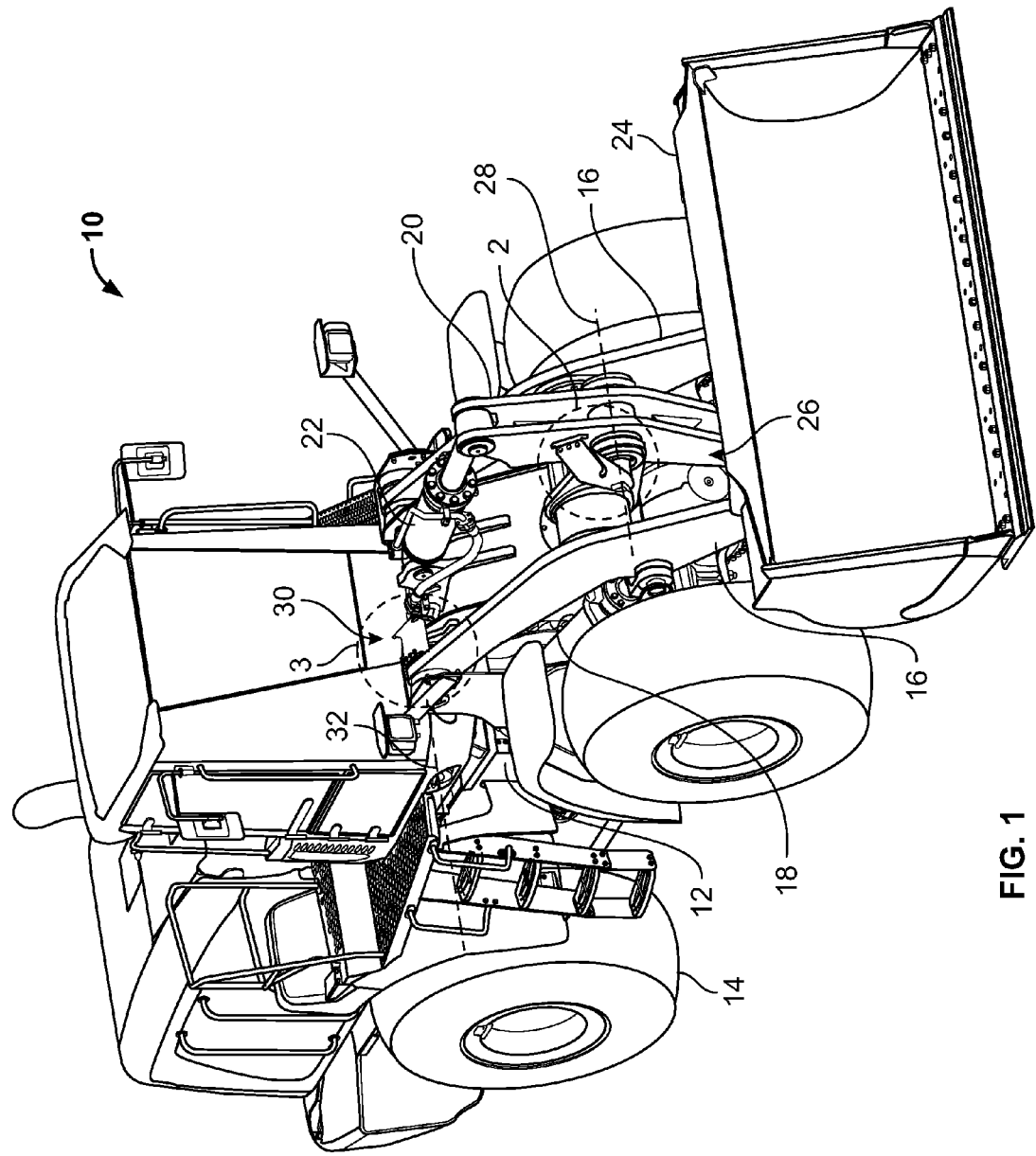
FIG. 1 shows an upper perspective view of an articulated machine using a rotary sensor assembly of the present disclosure.

Referring to the drawings, FIG. 1 shows a machine, such as a work vehicle 10 having a frame 12 that is movably carried by wheels 14. Frame 12 supports articulated linkages, such as a pair of lifting arms 16 that is urged into movement by hydraulic rams 18. Lifting arms 16 pivotably support a bell crank 20 that is urged into movement by hydraulic ram 22. The combination of articulating movement by lifting arms 16 and bell crank 20 control the position and orientation of an implement 24, such as a bucket. A rotary sensor assembly 26 measures angular rotation about an axis 28 between bell crank 20 and lifting arms 16. A rotary sensor assembly 30 measures angular rotation about an axis 32 between frame 12 and lifting arms 16. From this information, the location of lift arms 16, bell crank 20 and the orientation and position of implement 24 can be determined.

Figure 2:
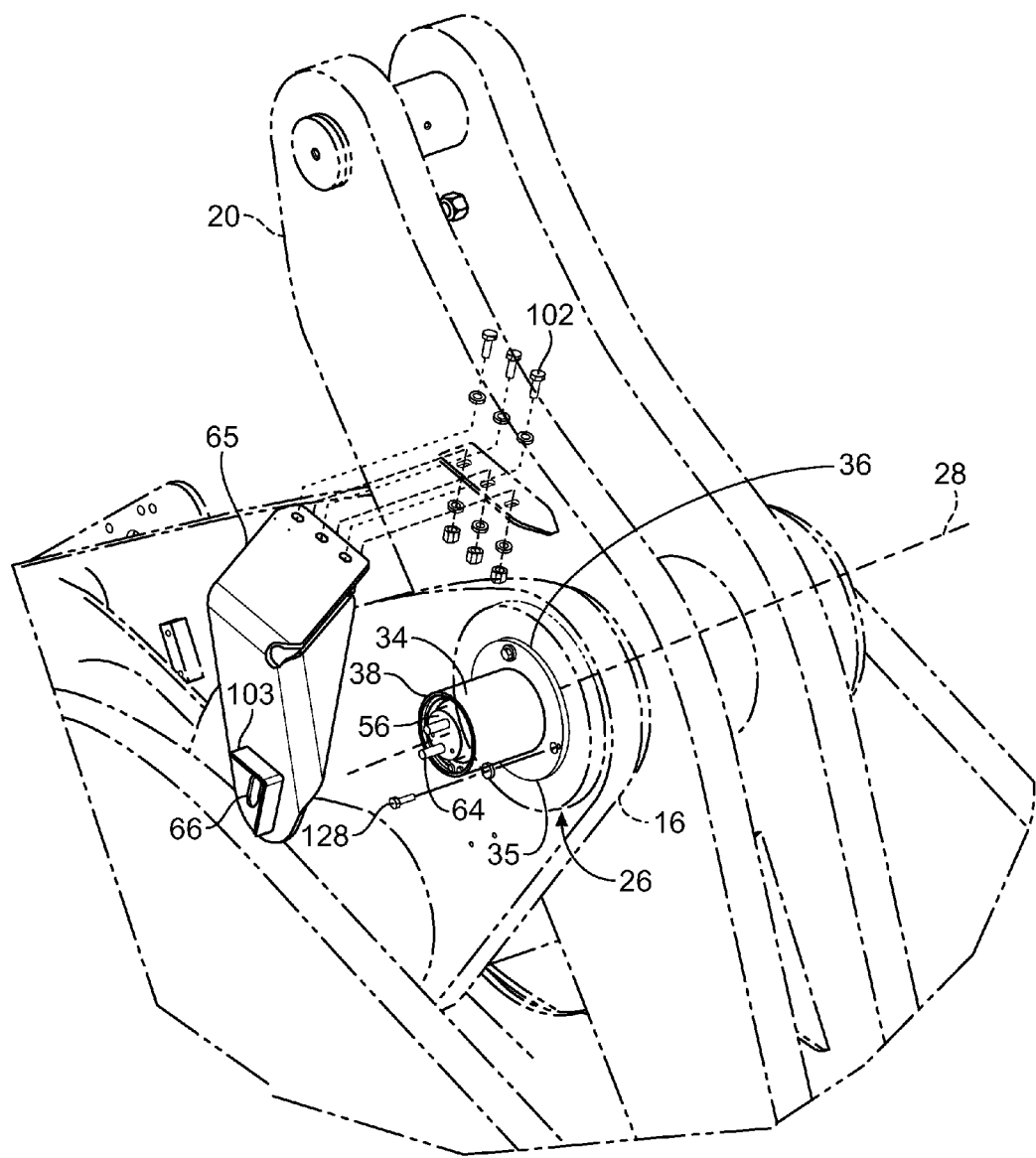
FIG. 2 shows an enlarged partial view of a rotary sensor assembly taken from region 2 of FIG. 1 of the present disclosure.

As shown in FIG. 2, which is taken from region 2 of FIG. 1, a rotational axis 28 defines a pivot joint between bell crank 20 and lifting arms 16. A rotary sensor assembly 26 is positioned along axis 28 to measure relative rotary movement between bell crank 20 and lifting arms 16. Rotary sensor assembly 26 includes a housing 34 having a proximal end 36 secured to lifting arms 16 by fasteners 128. Rotary sensor assembly 26 also includes a bracket 65 that is secured to bell crank 20 by fasteners 102 inserted through corresponding slotted openings formed in bracket 65 and bell crank 20. Bracket 65 includes a slot 66 that is configured to receive a second pair of pins 64 mounted in a cap 56. During angular rotation about axis 28, slot 66 of bracket 65 which moves in unison with bell crank 20, rotationally engages and urges second pair of pins 64 to also rotate about axis 28 relative to housing 34. In order to help protect the second pair of pins 64 during operation of work vehicle 10 (FIG. 1), bracket 65 includes a guard member 103. It is to be understood that rotary sensor assembly 26 includes a sensor 48 (FIG. 6), such as a rotary sensor that is a precision instrument. Similarly, there must exist a certain degree or level of precision in the output of sensor 48 relative to the angular position of cap 56. However, at least partially, by virtue of use of slotted openings formed in bracket 65 and bell crank 20, in combination with slot 66, a reduction in the level or degree of precision of a number of articulating components associated with rotary sensor assembly 26 can be used while maintaining a certain level or degree of precision between the output of sensor 48 (FIG. 6) and the angular position of 56. Therefore, subsequent reference to reduced precision of components are thus intended to refer to articulating components or other components or portions of components associated with rotary sensor assembly 26, as well as reduced precision of components of the work vehicle itself, that would not detrimentally affect the certain level or degree of precision between the rotational position of cap 56 with respect to the output of sensor 48.

Figure 3:
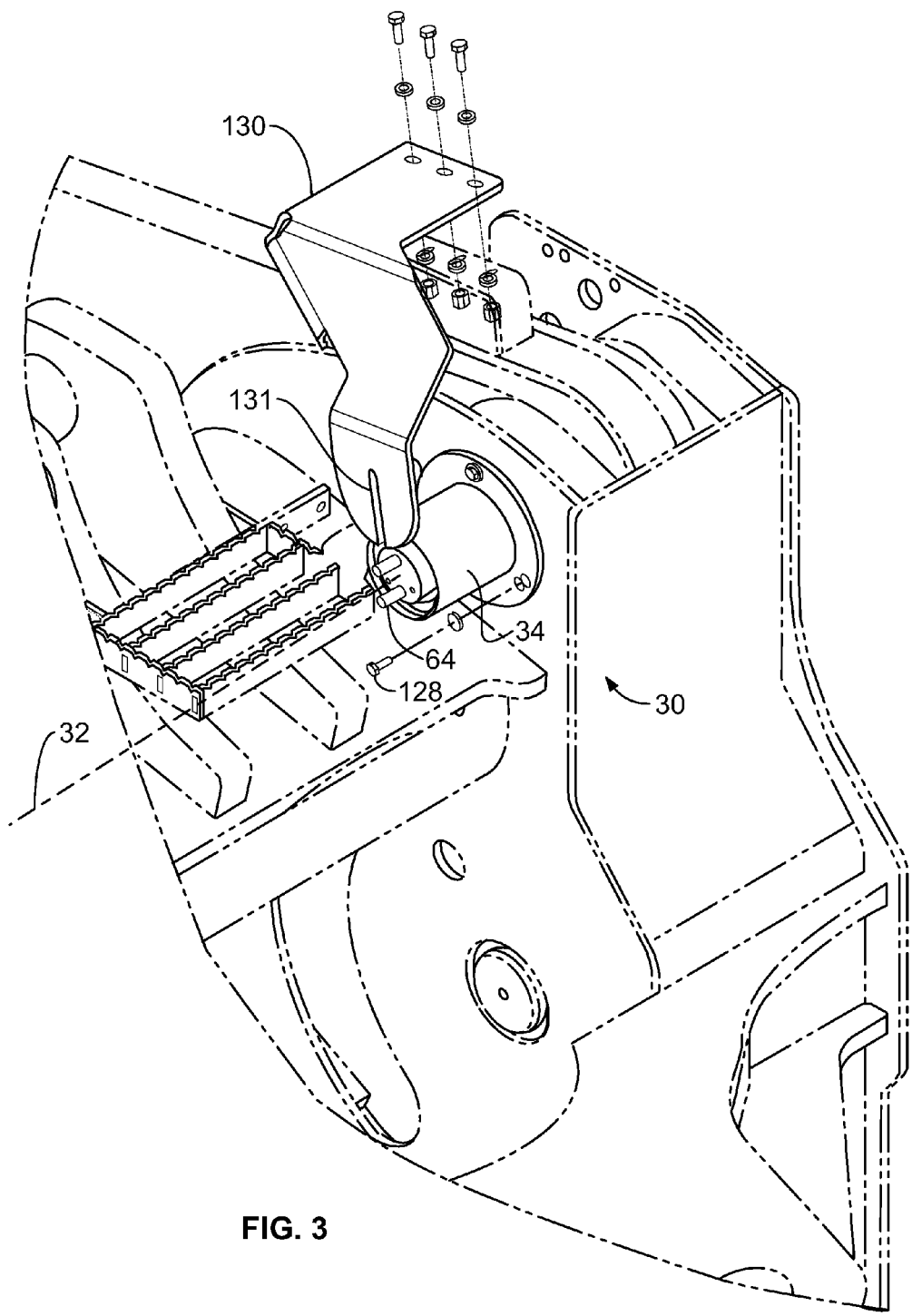
FIG. 3 shows an enlarged partial reverse view of a rotary sensor assembly taken from region 3 of FIG. 1 of the present disclosure.

As shown in FIG. 3, which is a reverse view of a pivot joint having a rotational axis 32 and using a rotary sensor assembly 30 taken from region 3 of FIG. 1, makes use of the same housing 34 used in FIG. 2. A rotary sensor assembly 30 is positioned along axis 32 to measure relative rotary movement between frame 12 (FIG. 1) and lifting arms 16. A bracket 130 including a slot 131 functions in a manner similar to that of bracket 65 and slot 66 as previously discussed.

For purposes herein, more detailed description of components contained inside of housing 34 will reference a rotational axis 28, as associated with rotary sensor assembly 26, as shown in FIG. 2.

Figure 4:
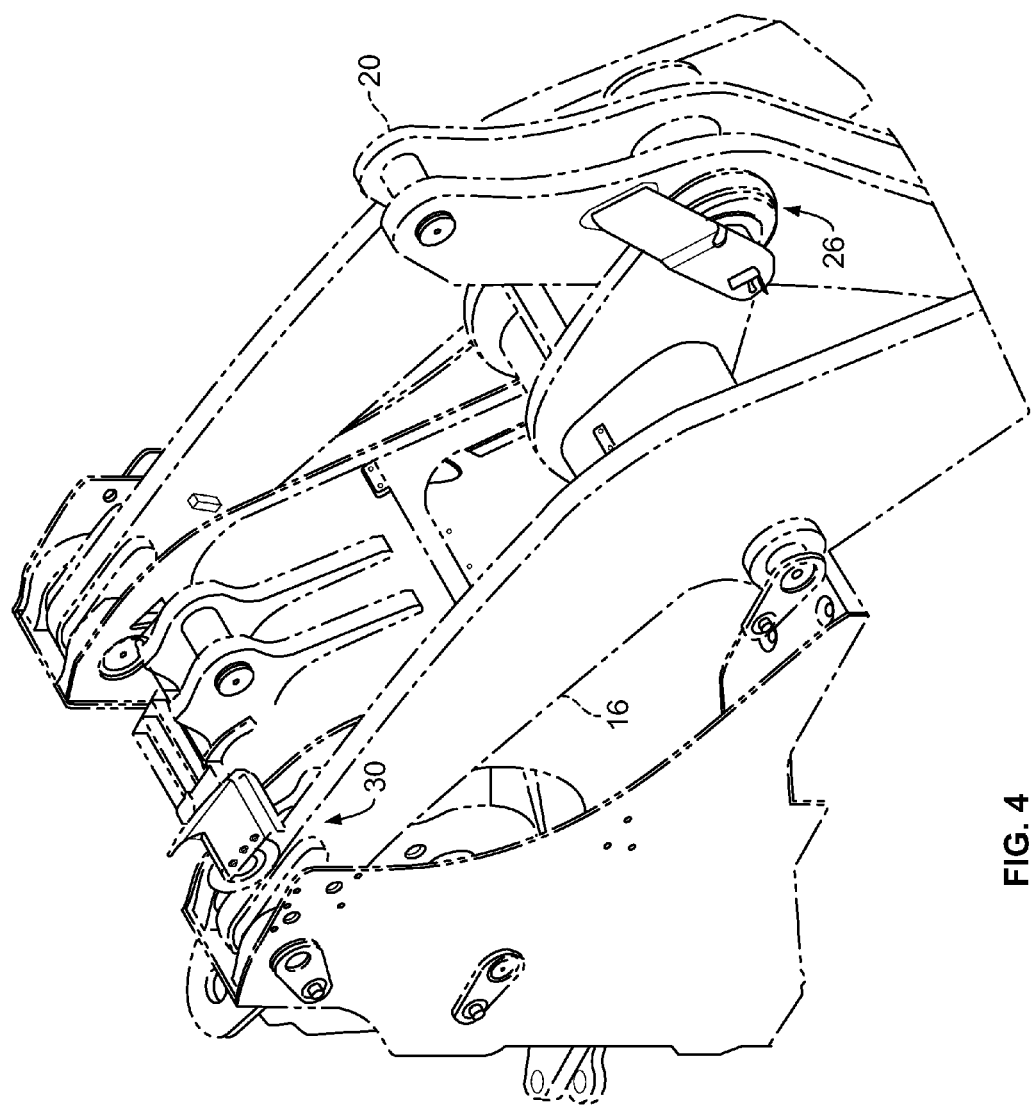
FIG. 4 shows an enlarged partial perspective view of rotary sensor assemblies of FIGS. 2 and 3 of the present disclosure.

FIG. 4 shows an enlarged partial perspective view of respective rotary sensor assemblies 26, 30 of FIGS. 2 and 3.

Figure 5:
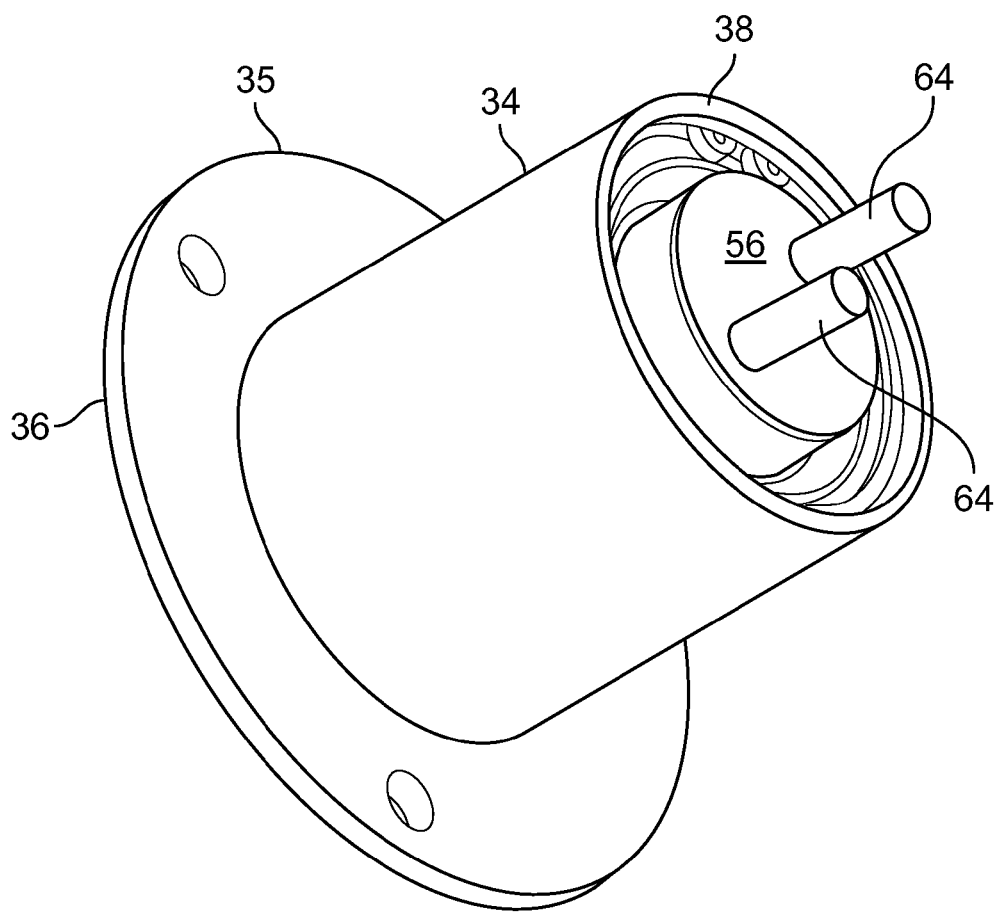
FIG. 5 shows an enlarged perspective view of a portion of a rotary sensor assembly of the present disclosure.
Figure 6:
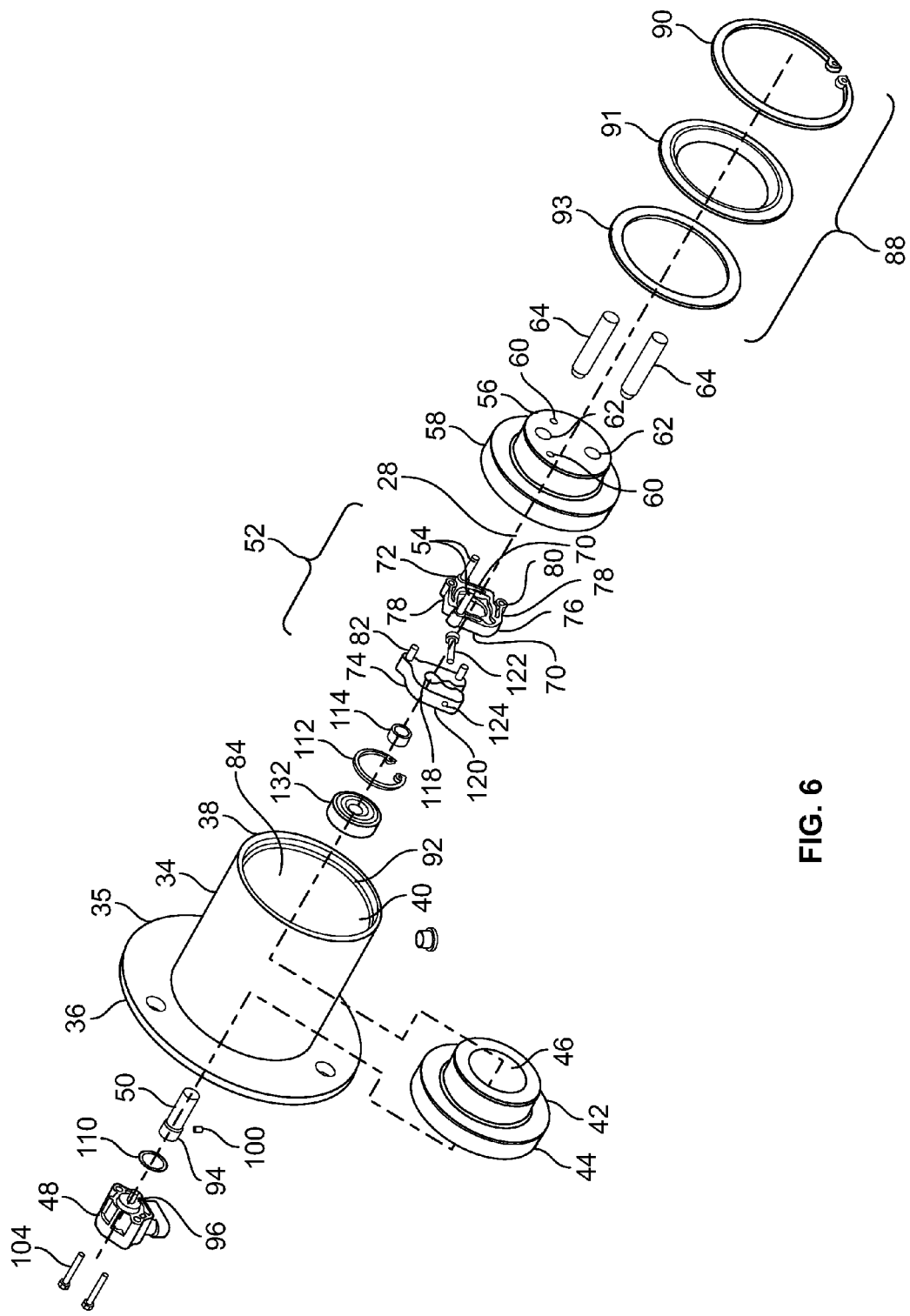
FIG. 6 shows an exploded view of the portion of the rotary assembly FIG. 5 of the present disclosure.
Figure 7:
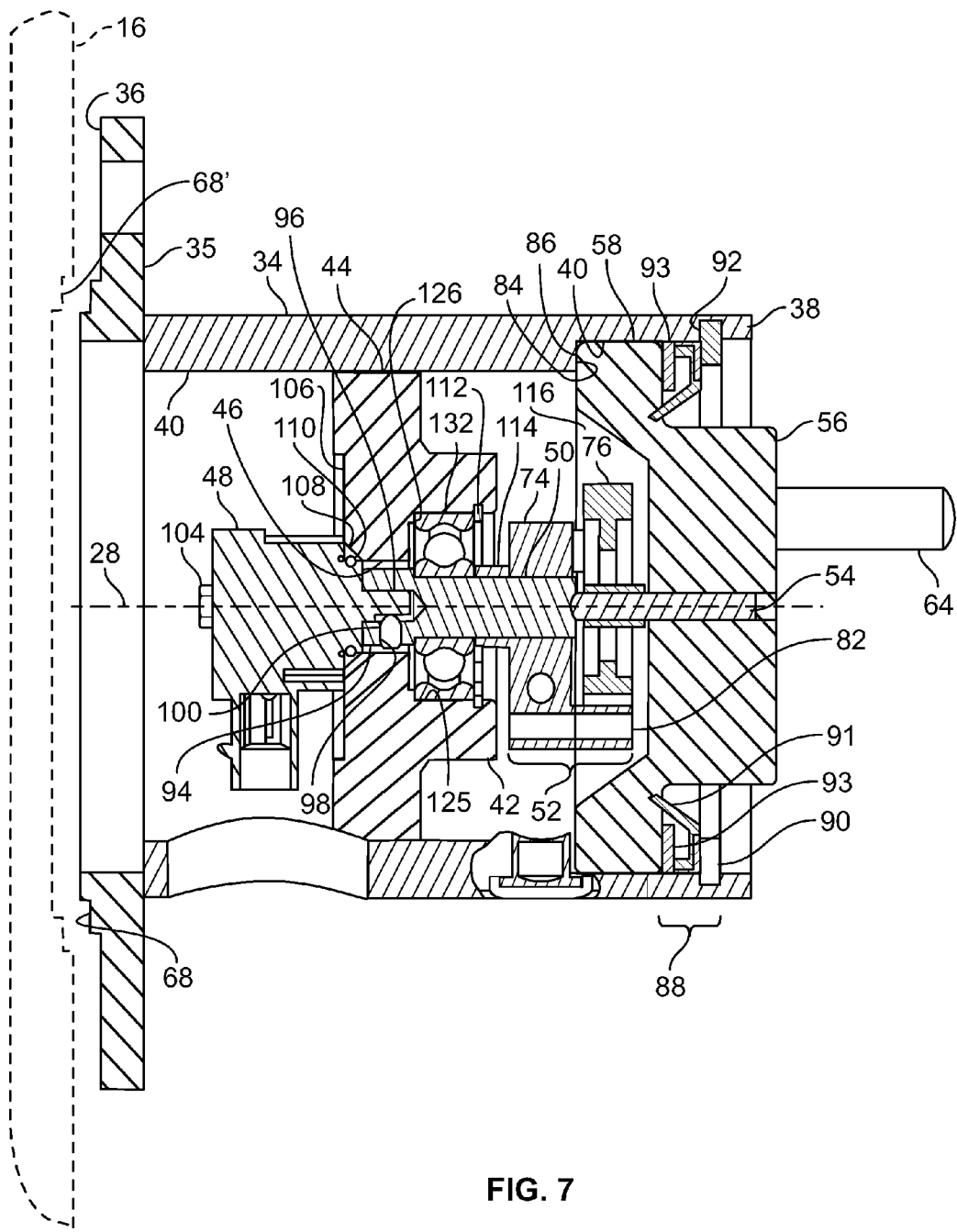
FIG. 7 shows a cross section of an assembled portion of the rotary assembly of FIG. 6 of the present disclosure.

As shown in FIGS. 5-7, housing 34 includes proximal end 36 that is secured to a first member such as lifting arms 16 (FIG. 2), or in another embodiment to frame 12 (FIG. 3). As further shown, housing 34 includes an annular flange 35 having positioning features 68, such as concentric shoulders formed in proximal end 36 that will engage mating positioning features 68' formed in the corresponding portion of lifting arms 16. Although the shoulders of positioning features 68 formed in proximal end 36 are shown extending outwardly from proximal end 36 of housing 34, it is appreciated that in another embodiment, the shoulders of positioning features 68 formed in proximal end 36 may extend inwardly from proximal end 36 of housing 34 with the mating positioning features formed in the corresponding portion of lifting arms 16 extending outwardly. In another embodiment, other configurations of positioning features may be used.

As further shown in FIGS. 6-7, housing 34 includes an inner surface 40, as well as proximal end 36 and distal end 38. A first fitting 42 has an outer surface 44 that corresponds to inner surface 40 of housing 34 when first fitting 42 is inserted inside of housing 34. In one embodiment, upon insertion, first fitting 42 is welded to housing 34. First fitting 42 further includes an opening 46 that is substantially parallel to axis 28 of a pivot joint. At one end of opening 46 facing proximal end 36 is a counterbore 106 that includes a chamfer 108 that forms a seal with an O-ring 110 when rotatable shaft 96 of a sensor 48 is inserted inside of opening 46. Sensor 48 is secured to first fitting 42 by fasteners 104. As shown in the figures, shaft 50 has a head 94 that is secured to shaft 96 of sensor 48 by virtue of a threaded opening 98 that receives a threaded pin 100 and engages a flat portion formed in shaft 96 of sensor 48. Shaft 50 is secured to shaft 96 of sensor 48 prior to shaft 96 of sensor 48 being directed inside of opening 46.

As further shown in FIGS. 6-7, the opposite end of opening 46 facing distal end 38 includes a counterbore 125 including a shoulder 126 against which a bearing 132 abuts upon insertion inside of counterbore 125. Bearing 132 is captured inside of counterbore 125 by a retention ring 112. In one embodiment, opening 46 may be sized such that the outer surface of shaft 50 is journaled thereby. In either construction, i.e., bearing 132 or journaling between the outer surface of shaft 50 and a corresponding portion of opening 46, the resulting fit with the outer surface of rotatable shaft 50 and first fitting 42 is such that residual side loads are reacted by bearing 132 or the interface between the outer surface of shaft 50 and opening 46. As further shown in FIGS. 6-7, a spacer 114 is installed over the outer surface of shaft 50. The remaining portion of shaft 50 extending past spacer 114 is received in an opening 118 of a first portion 74 of a flexible coupling 52. First portion 74 includes a pair of legs 120 extending from opposed sides of opening 118. An opening, such as a threaded opening 124 is formed near the end of legs 120, and is configured to receive a fastener 122, such as a threaded fastener. Upon sufficient actuation of fastener 122, legs 120 are urged together, thereby reducing the size of opening 118 over the outer surface of shaft 50 such that first portion 74 and shaft 50 rotatably move in unison. First portion 74 further includes a third pair of pins 82 that extend substantially parallel to axis 28 of the pivot joint. A second portion 76 of flexible coupling 52 includes a second pair of arms 78 extending substantially perpendicular to axis 28 of the pivot joint, with each arm of second pair of arms 78 terminating at an opening 80 that is configured to receive a corresponding pin of the third pair of pins 82 of first portion 74. Second portion 76 of flexible coupling 52 also includes a first pair of arms 70 extending substantially perpendicular to axis 28 of the pivot joint, with each arm of first pair of arms 70 terminating at an opening 72 that is configured to receive a corresponding pin of a first pair of pins 54. First pair of pins 54 extend toward distal end 38 of housing 34 substantially parallel to axis 28 of the pivot joint. Due to each of first portion 74 and second portion 76 of flexible coupling 52 being constructed of a resilient material, such as plastic or other suitable material, first pair of arms 70 and second pair of arms 78 can be subjected to an amount of flexure. Such flexure permits an amount of misalignment, such as resulting from a reduction in the level or degree of precision associated with the manufacture of components housed within housing 34, and including housing 34, also referred to as tolerance build-up, resulting in components that are less expensive to manufacture, while not detrimentally affecting the desired level of precision between the rotational position of cap 56 with respect to the output of sensor 48. In one embodiment flexible coupling 52 may combine the first portion and second portion into an integral construction, also referred to as one-piece or unitary construction.

As further shown in FIGS. 6-7, a cap 56 includes an outside surface 58 and a peripheral portion 86 near outside surface 58. When inserted inside housing 34 through distal end 38, outside surface 58 of cap 56 corresponds to inner surface 40 of housing 34, and peripheral portion 86 of cap 56 abuts shoulder 84 of housing 34. A first pair of openings 60 formed in cap 56 is configured to correspondingly receive the first pair of pins 54 of second portion 76 of flexible coupling 52. A recess 116 is formed in cap 56 of sufficient size and depth to ensure that second portion 76 (other than first pair of pins 54) do not abut or otherwise engage cap 56. Cap 56 is sealingly constrained from movement parallel to axis 28 when installed inside of housing 34 by shoulder 84 and a seal assembly 88 including a washer 93, a sealing ring 91 and a retention ring 90 that is secured in a groove 92 formed in inner surface 40 of housing 34. Cap 56 further includes a second pair of openings 62 configured to correspondingly receive a second pair of pins 64 that extend substantially parallel to axis 28 and extend exterior of housing 34 past distal end 38. By virtue of their interconnection, rotational movement of second pair of pins 64 about axis 28 results in a similar rotational movement of cap 56 flexible coupling 52, shaft 50 and shaft 96 of sensor 48. As shown in FIG. 2, second pair of pins 64 engage slot 66 of bracket 65. By virtue of using slot 66 to engage second pair of pins 64, a reduction in the level or degree of precision associated with the manufacture of a number of components housed within housing 34 can be utilized to reduce the cost of the components without detrimentally affecting a certain level or degree of precision between the rotational position of cap 56 with respect to the output of sensor 48.

Referring to FIGS. 2, 7 and 8, the operation of rotary sensor assembly 26 is described. With bracket 65 installed such that slot 66 captures second pair of pins 64 extending from housing 34, rotation of bell crank 20 with respect to lift arms 16 about axis 28 of pivot joint occurs by a change of length of hydraulic ram 22 (FIG. 1). In response to a change of length of hydraulic ram 22, bell crank 20, and therefore bracket 65, as well as slot 66 rotates about axis 28 with respect to lift arms 16 and housing 34. However, by virtue of slot 66 capturing second pair of pins 64, second pair of pins 64 is urged to likewise rotate about axis 28. Similarly, due to the respective interconnections as previously discussed above between cap 56, flexible coupling 52, shaft 50 and shaft 96 of sensor 48, rotation of second pair of pins 64 similarly urges each of cap 56, flexible coupling 52, shaft 50 and shaft 96 into virtually the same amount of rotation about axis 28. An amount of rotation of sensor 48 results in a change in voltage or resistance or other parameter that is output by sensor 48, the change in voltage, resistance or other parameter corresponding to a known amount of angular rotation. This construction provides a rugged, reliable assembly that permits a certain precision relationship between the rotational position of cap 56 with respect to the output of sensor 48 while isolating the sensor from outside forces subjected from both the manufacture (tolerance stackup) of the work vehicle and the operation of the work vehicle.

It is to be understood that the rotary sensor assembly of the present disclosure could be used with other machines requiring precision measurement of rotational movement between two members of the machine.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A sensor assembly for measuring relative rotary movement about a pivot joint having an axis of rotation between a first member and a second member comprising:
    a housing having a proximal end and a distal end and an inner surface, the proximal end fixedly secured to the first member;
    a first fitting having an outer surface and an opening, the outer surface abutting the inner surface of the housing between the proximal end and the distal end, the opening formed in the first fitting being substantially parallel to the axis of the pivot joint;
    a sensor secured to the opening and facing the proximal end of the housing;
    a shaft rotatable about the axis of the pivot joint and affixed to the sensor and extending through the opening of the first fitting, the shaft journaled along a portion of the opening of the first fitting that faces a distal end of the housing;
    a flexible coupling configured to fixedly receive a portion of the shaft extending from the opening of the first fitting so that the flexible coupling and the shaft rotate together;
    a first pair of pins extending from the flexible coupling;
    a cap rotatable about the axis of the pivot joint and having an outside surface, a first pair of openings, and a second pair of openings, the outside surface of the cap corresponding to the inner surface of the housing, the first pair of openings configured to receive the first pair of pins extending from the flexible coupling, the second pair of openings configured to receive a second pair of pins extending through the distal end of the housing;
    a bracket secured to the second member and extending to a slot configured to receive the second pair of pins.

2. The sensor assembly of claim 1, wherein the proximal end of the housing includes a flange.

3. The sensor assembly of claim 2, wherein the flange includes positioning features corresponding to mating positioning features formed in the first member.

4. The sensor assembly of claim 1, wherein the flexible coupling includes a pair of arms each having an opening formed therein configured to receive a corresponding pin of the first pair of pins.

5. The sensor assembly of claim 4, wherein the flexible coupling comprises a first portion and a second portion, the second portion including a second pair of arms each having an opening formed therein configured to receive a corresponding pin of a third pair of pins extending from the first portion.

6. The sensor assembly of claim 1, wherein the inner surface of the housing includes a shoulder configured to abut a peripheral portion of a surface of the cap located near the outside surface.

7. The sensor assembly of claim 6, wherein the cap is captured between the shoulder of the housing and a seal assembly positioned near the distal end of the housing.

8. The sensor assembly of claim 7, wherein the seal assembly includes a retention ring that is secured in a groove formed in the inner surface of the housing near the distal end.

9. The sensor assembly of claim 1, wherein the shaft includes a head that is configured to receive a rotatable shaft extending from the sensor.

10. The sensor assembly of claim 9, wherein the head of the shaft includes a threaded opening configured to receive a threaded pin for securing the head of the shaft to the rotatable shaft extending from the sensor.

11. The sensor assembly of claim 1, wherein the bracket is secured to the second member by fasteners extending through slotted openings formed in the bracket.

12. The sensor assembly of claim 1, wherein the bracket includes a guard member near the slot.

13. A method for measuring relative rotary movement about a pivot joint having an axis of rotation between a first member and a second member comprising:
  securing to the first member a sensor assembly comprising:
    a housing having a proximal end and a distal end and an inner surface, the proximal end fixedly secured to the first member;
    a first fitting having an outer surface and an opening, the outer surface abutting the inner surface of the housing between the proximal end and the distal end, the opening formed in the first fitting being substantially parallel to the axis of the pivot joint;
    a sensor secured to the opening and facing the proximal end of the housing;
    a shaft rotatable about the axis of the pivot joint and affixed to the sensor and extending through the opening of the first fitting, the shaft journaled along a portion of the opening of the first fitting that faces a distal end of the housing;
    a flexible coupling configured to fixedly receive a portion of the shaft extending from the opening of the first fitting so that the flexible coupling and the shaft rotate together;
    a first pair of pins extending from the flexible coupling;
    a cap rotatable about the axis of the pivot joint and having an outside surface, a first pair of openings, and a second pair of openings, the outside surface of the cap corresponding to the inner surface of the housing, the first pair of openings configured to receive the first pair of pins extending from the flexible coupling, the second pair of openings configured to receive a second pair of pins extending through the distal end of the housing; and
  securing to the second member a bracket that extends to a slot configured to receive the second pair of pins.

14. The method of claim 13, wherein the positioning features resembling concentric shoulder portions.

15. The method of claim 14, wherein the shoulder portions extend outwardly from the proximal end of the housing.

16. The method of claim 14, wherein the shoulder portions extend inwardly from the proximal end of the housing.

17. The method of claim 13, wherein the flexible coupling includes a pair of arms each having an opening formed therein configured to receive a corresponding pin of the first pair of pins.

18. The method of claim 17, wherein the flexible coupling comprises a first portion and a second portion, the second portion including a second pair of arms each having an opening formed therein configured to receive a corresponding pin of a third pair of pins extending from the first portion.

19. The method of claim 13, wherein the inner surface of the housing includes a shoulder configured to abut a peripheral portion of a surface of the cap located near the outside surface.

20. The method of claim 13, wherein the bracket includes a guard member near the slot.

* * * * *